(12) United States Patent
Fujibayashi et al.

(10) Patent No.: US 6,933,995 B2
(45) Date of Patent: Aug. 23, 2005

(54) LIQUID CRYSTAL DISPLAY DEVICE AND METHOD OF MANUFACTURING THE SAME

(75) Inventors: Sadayasu Fujibayashi, Saitama-ken (JP); Atsuko Oono, Saitama-ken (JP); Ryoichi Watanabe, Kanagawa-ken (JP); Yoshitaka Yamada, Saitama-ken (JP); Hirokazu Morimoto, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 45 days.

(21) Appl. No.: 10/622,702

(22) Filed: Jul. 21, 2003

(65) Prior Publication Data

US 2004/0105043 A1 Jun. 3, 2004

(30) Foreign Application Priority Data

Jul. 29, 2002 (JP) ........................ 2002-219888

(51) Int. Cl.[7] ................. G02F 1/1368; G02F 1/1335
(52) U.S. Cl. ................. 349/113; 349/111; 349/138
(58) Field of Search ................. 349/110, 111, 349/113, 114, 122, 138; 257/59, 72; 345/92; 438/30

(56) References Cited

U.S. PATENT DOCUMENTS 6,295,109 B1  9/2001  Kubo et al.
2003/0025857 A1 * 2/2003 Ochiai et al. ............. 349/106
2003/0076464 A1 * 4/2003 Ozawa et al. ............. 349/113
2003/0081159 A1 * 5/2003 Ha et al. ................... 349/113
2004/0105043 A1   6/2004 Fujibayashi et al.
2004/0201799 A1 * 10/2004 Nakayoshi et al. ....... 349/106

OTHER PUBLICATIONS

U.S. Appl. No. 10/975,478, filed Oct. 29, 2004, Ootake et al.

* cited by examiner

Primary Examiner—Toan Ton
Assistant Examiner—Tai Duong
(74) Attorney, Agent, or Firm—Oblon, Spivak, McClelland, Maier & Neustadt, P.C.

(57) ABSTRACT

An LCD device includes a transparent glass plate 122 and thin film transistor electrodes 124 formed on the glass plate 122. A photosensitive insulation film 128 is coated on the glass plate 122 and the thin film transistor electrodes 124. The insulation film 128 includes transparent and reflective regions 134 and 133 which are different in thickness. Light shielding films 126 are positioned underneath boundaries of the transparent and reflective regions 134 and 133. Where an optical exposure stage includes different reflection coefficient portions, the light shielding films 126 prevent light reflected by the exposure stage from reaching the insulation film thereby maintaining the accuracy of its patterning.

4 Claims, 5 Drawing Sheets

LIQUID CRYSTAL DISPLAY DEVICE AND METHOD OF MANUFACTURING THE SAME

FIELD OF THE INVENTION

This invention generally relates to a liquid crystal display device and a method of manufacturing the same and, more particularly, to a liquid crystal display device requiring highly accurate dimensions of a photomask pattern designed for the exposure of photoresist and a method of manufacturing such liquid crystal display device.

BACKGROUND OF THE INVENTION

A half transparent or hybrid type liquid crystal display (LCD) device includes a thin film transistor (TFT) array substrate, which is, in turn, provided with reflective and transparent display portions. The reflective display portion is generally made of thin film transistors formed on the TFT array substrate, an insulation film covering the thin film transistors and reflective electrodes formed on the insulation film. The transparent display portion is, on the other hand, made of the insulation film and transparent electrodes. The insulation film of the reflective display portion is different in thickness from that of the transparent display portion to increase the reflectivity and transmittance of the reflective and transparent display portions, respectively. In addition, when the TFT array substrate is put together with a counter substrate, the cell gaps defined in the reflective and transparent display portions are configured to be optimal, respectively. In order to adjust such thickness difference between the reflective and transparent display portions, a photoresist is coated on both the reflective and transparent display portions of the TFT array substrate, the transparent display portion is subjected to an optical exposure treatment, and both reflective and transparent display portions are developed and post-baked.

Since a photoresist with high transmittance is, however, used for the insulation film, it is subjected to reflecting light from an exposure stage during the exposure treatment.

As shown in FIG. 5, an optical exposure stage 210 is provided with recesses 212, which are used to set a TFT array substrate on the exposure stage 210 or to detach it from the stage 210, and plates 214. Although the recesses 212 do not reflect incident light, the plates 214 reflect it as shown by dotted lines and arrows. Thus, portions of an insulation film 128 corresponding to the recesses 212 receive incident light passing through a photomask 208. The other portions of the insulation film 128 corresponding to the plates 214, however, receive not only incident light passing through the photomask 208 but also reflecting light from the plates 214. Since pattern dimensions depend on a received quantity of light, patterns of the portions positioned above the recesses 212 are small in width but those of the portions positioned above the plates 214 are wide in width though not shown in different widths in FIG. 5. Such different widths in the patterns cause visibly uneven brightness of images displayed by an LCD device.

SUMMARY OF THE INVENTION

It is, accordingly, an object of the present invention to provide an LCD device without such visibly uneven brightness.

It is another object of the present invention to provide an LCD device with improvement of such visibly uneven brightness caused by width differences in patterns resulting from a received quantity of light reflecting from an optical exposure stage.

According to one aspect of the present invention, an LCD device comprises a substrate, thin film transistors formed on the substrate, an insulation film defining first and second regions to cover the thin film transistors, the first and second regions of the insulation film being different in thickness from each other, and light shielding films provided at portions underneath boundaries of the first and second regions.

The LCD device further comprises transparent electrode film formed on the first region, and reflective electrode film formed on the second region.

The LCD device is characterized in that the light shielding film is made of the same material as the thin film transistors.

According to another aspect of the present invention, a method of manufacturing an LCD device comprises the steps of forming a light shielding film with first and second regions on a substrate, forming a photosensitive insulation film on the light shielding film, and exposing the insulation film to position the light shielding film at boundaries of the first and second regions by using a photomask.

The method of manufacturing a liquid crystal display device is characterized in that the step of forming the light shielding film further forms thin film transistors by using the same material as the light shielding film.

According to a unique aspect of the present invention, a method of manufacturing a liquid crystal display device comprises the steps of forming any one of reflective, light shielding or diffusing films on a back surface of a substrate, forming a photosensitive insulation film on a front surface of the substrate, and exposing the insulation film by using a photomask.

BRIEF DESCRIPTION OF THE DRAWINGS

A more complete appreciation of the present invention and many of the attendant advantages thereof will be readily obtained as the same becomes better understood by reference to the following detailed descriptions when considered in connection with the accompanying drawings, wherein.

DETAILED EXPLANATION OF THE PREFERRED EMBODIMENTS

Figure 1:
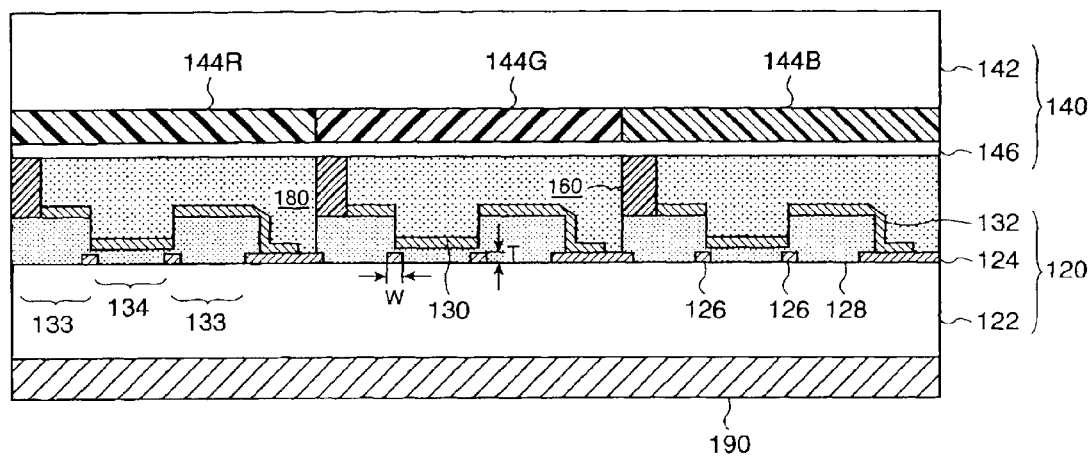
FIG. 1 shows a schematically sectional view of an LCD device in accordance with a first embodiment of the present invention.

Embodiments of the present invention will be explained below with reference to the attached drawings. It should be noted that the present invention is not limited to the embodiments but covers their equivalents. Throughout the attached drawings, similar or same reference numerals show similar, equivalent or same components. The drawings, however, are shown schematically for the purpose of explanation so that their components are not necessarily the same in shape or dimension as actual ones. In other words, concrete shapes or dimensions of the components should be considered as described in these specifications, not in view of the ones shown in the drawings. Further, some components shown in the drawings may be different in dimension or ratio from each other.

First Embodiment

FIG. 1 shows a schematically sectional view of an LCD device in accordance with a first embodiment of the present invention. As shown in FIG. 1, the LCD device includes a thin film transistor (TFT) array substrate 120 and a color filter substrate 140. The TFT array and color filter substrates 120 and 140 are provided opposite to each other, define a predetermined cell gap supported by spacers 160, and are put together by a sealing material around their peripheral portions. A liquid crystal material injected into the cell gap becomes a liquid crystal layer 180.

The TFT array substrate 120 includes a transparent glass plate 122, and TFT electrodes 124 and light shielding films 126 formed on the glass plate 122. The TFT electrodes 124 and light shielding films 126 are covered with an insulation film 128. Further, the insulation film 128 is coated with transparent electrodes 130 made of an indium-tin-oxide (ITO) film and reflective electrodes 132 made of a metal film. In order to widen a viewing field for reflecting light, the reflective electrodes 132 are provided with uneven portions. An alignment film (not shown) is coated on the transparent and reflective electrodes 130 and 132.

Figure 2:
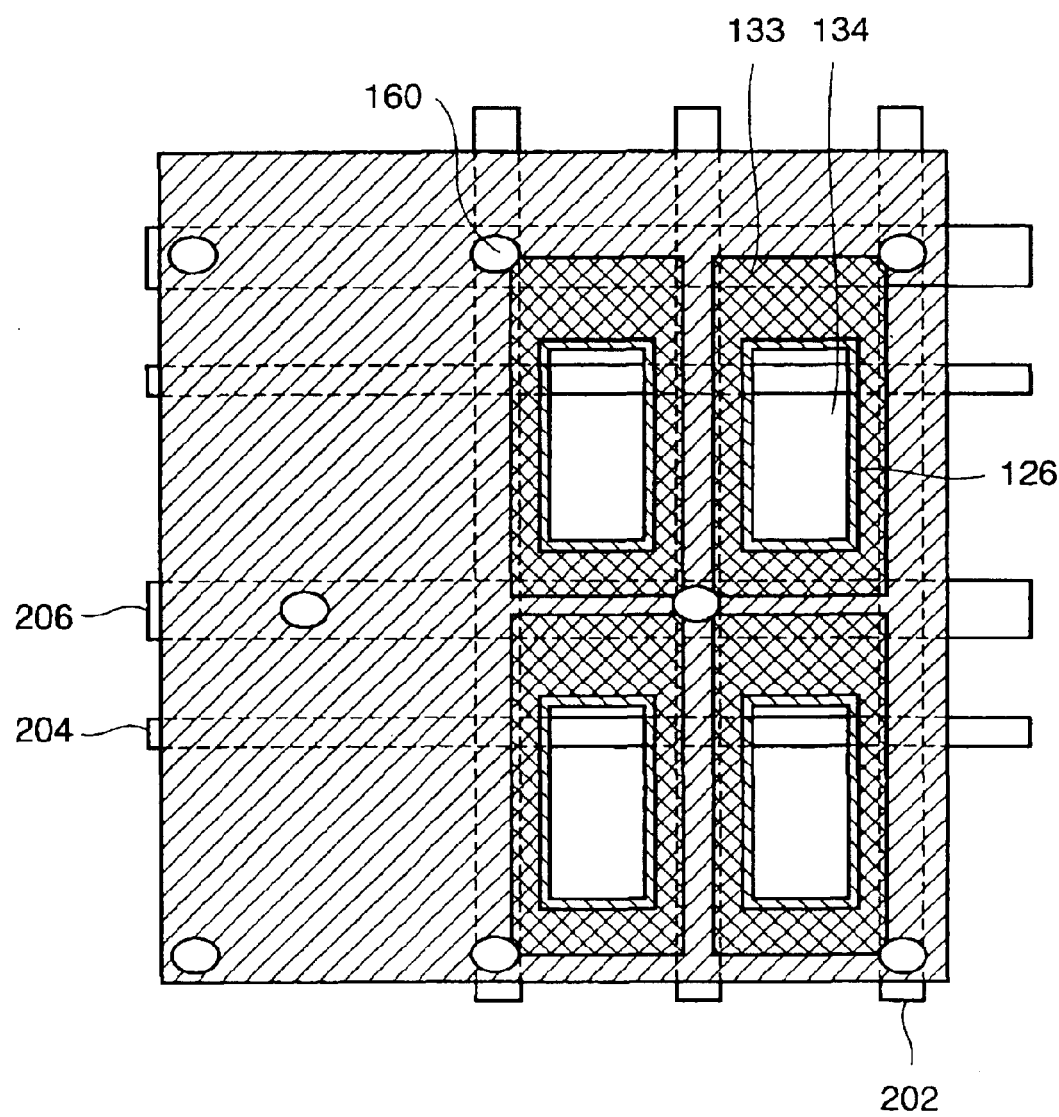
FIG. 2 is a partial schematic view of a layout of the LCD device shown in FIG. 1.

The light shielding films 126 to be explained later in detail with reference to FIG. 2 are made of such materials that substantially prevent light, which passes through regions of the transparent electrode and reflects from an optical exposure stage to be set forth later with reference to FIG. 3C, from arriving at regions of the reflective electrodes 132. They are preferably of the same materials as those of the TFT electrodes 124 such as molybdenum because the light shielding films 126 are formed in the same process as the TFT electrodes 124.

The light shielding films 126 are disposed at the locations underneath the boundary regions between transparent and reflection regions 134 and 133. The thickness and width of the light shielding films 126 are configured to substantially prevent light, which passes through regions of the transparent electrodes and reflects from the exposure stage, from arriving at regions of the reflective electrodes 132. In other words, the thickness and width of the light shielding films 126 are determined in accordance with a material and light beam radiating conditions, such as light wavelength, frequency, and radiating angle and duration. For example, where such a material and radiating energy are molybdenum and 300 mJ/cm$^2$, respectively, the light shielding films 126 are 0.3 $\mu$m to 10 $\mu$m in thickness and preferably about 6 $\mu$m in width.

FIG. 2 shows a partial schematic view of a layout of the LCD device shown in FIG. 1. As shown in FIG. 2, signal lines 202 cross over scanning lines 204 to form a matrix. The transparent and reflective regions 134 and 133 are provided in each element (pixel) of the matrix. Auxiliary capacitor lines 206 are disposed in parallel with the scanning lines 204. As described above, the light shielding films 126 are provided at the locations underneath the boundary regions between the transparent and reflection regions 134 and 133. Thus, the light shielding films 126 are shown in locations between the transparent and reflective regions 134 and 133 in FIG. 2. In short, the light shielding films 126 are provided to surround the transparent regions 134.

On the other hand, as shown in FIG. 1, the color filter substrate 140 includes color photoresist films 144R (red), 144G (green) and 144B (blue) formed on a transparent glass plate 142. A transparent electrode 146 and is coated with an alignment film (not shown).

Further, there are two different length optical paths by way of the liquid crystal layer 180 through which light passes in response to transparent and reflective display modes of the LCD device shown in FIG. 1, respectively.

Namely, when the LCD device carries out the transparent display mode, light from a rear light source 190 passes through the liquid crystal layer 180 once. However, when it carries out the reflective display mode, incident light from color photoresist film 144 passes through the liquid crystal layer 180 and light reflecting from the reflective electrode 132 passes through the liquid crystal layer 180 again. Where the height of the reflective electrode 132 is the same as that of the transparent electrode 130, the optical length of the reflecting light is much longer than that of the light passing through. Thus, in order to obtain optimal optical characteristics in both transparent and reflective display modes, the cell gaps between the transparent electrode 130 and the electrode 146 and that between the reflective electrode 132 and the electrode 146 are necessarily designed to be optimum. The former is bigger than the latter as shown in FIG. 1 to adjust the optical lengths to be optimum. For that purpose, optical exposure is carried out only for the regions in the substrate on which the transparent electrodes are formed and, then, the substrate is subjected to development and post baking processes.

Figure 3A:
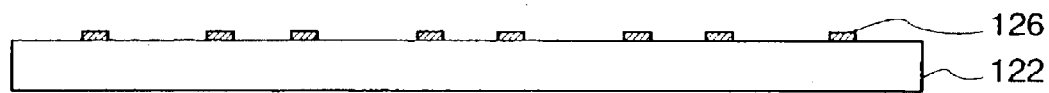
FIGS. 3A to 3C are sectional views of components to explain production steps of the LCD device in accordance with the first embodiment of the present invention.
Figure 3B:
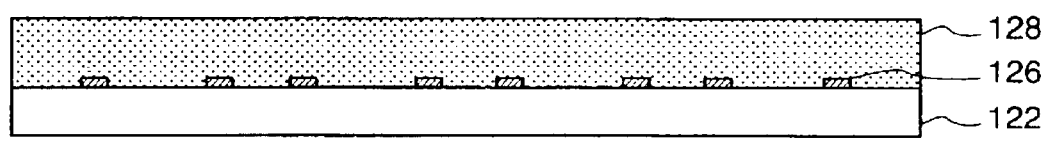

A method of manufacturing the LCD device of the first embodiment will be explained with reference to FIGS. 3A, 3B and 3C. The method of manufacturing the LCD device is primarily characterized in that the light shielding films 126 are formed on the glass plate 122 as shown in FIG. 3A, the photosensitive insulation film 128 is further coated on the light shielding films 126 and the glass plate 122 as shown in FIG. 3B and optical energy radiation is carried out only for the transparent regions of the insulation films 128 by using the photomask 208 as shown in FIG. 3C.

Figure 3C:
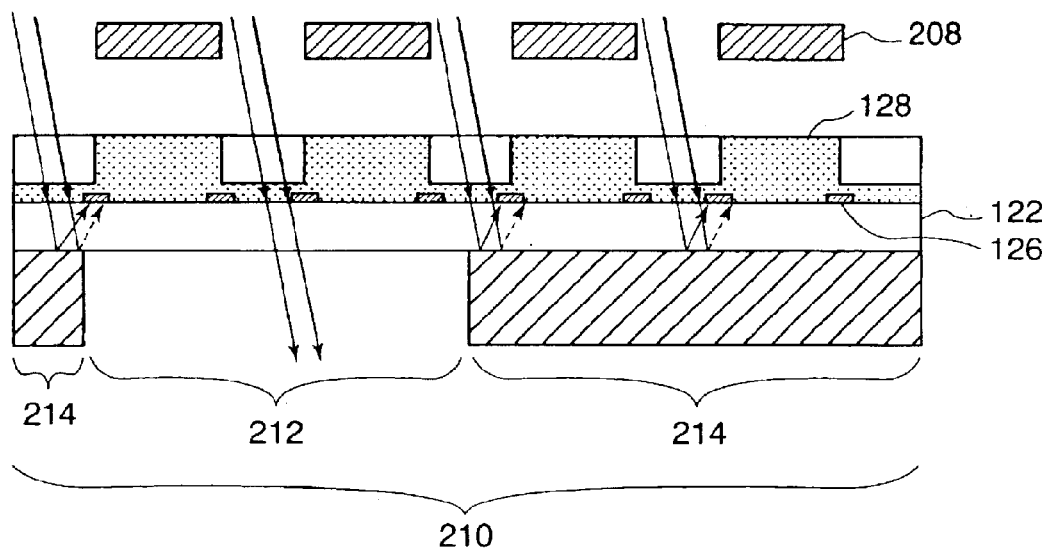

As shown in FIG. 3C, the radiating light passes through the hole 212 of an optical exposure stage 210 and travels to the other side of the exposure stage 210. The reflecting light from the plates 214, on the other hand, travels in the glass plate 122 again but does not reach the insulation film 128 because the light shielding films 126 stop it. Thus, the portions of the insulation film 128 positioned above both the hole 212 and the plates 214 receive substantially the same quantity of light.

A comparison test has been made for each of the following LCD devices: (1) the first embodiment LCD device provided with patterns of the thick and thin portions of the insulation film underneath the transparent and reflective electrodes 130 and 132, respectively, and with the light shielding films 126 formed around the transparent regions 134, and (2) a prior art LCD device provided with patterns of the thick and thin portions of the insulation films underneath the transparent and reflective electrodes, respectively, but with no light shielding films. As a result, 70% uneven display has been visibly recognized for the prior art LCD device but no uneven display has been visibly recognized for the first embodiment LCD device.

Since, as described above with respect to the first embodiment, the receiving quantity of light is substantially equal for both portions of the insulation film 128 positioned above the holes 212 and the plates 214, neither the patterns positioned above the holes 212 become narrow in width nor those above the plates 214 become wide in width. Its structure does not bring about an uneven display.

For the sake of simplicity, the TFT electrodes 124 are omitted from the drawings of FIGS. 3A to 3C. In order to reduce manufacturing steps, time and costs, it is preferable to form the TFT electrodes 124 at the same time, and by using the same material, as the light shielding films 126.

Second Embodiment

The LCD device according the first embodiment of the present invention prevents an uneven display due to different reflection coefficients at the exposure stage 210 with the light shielding films 126 provided at predetermined locations between the glass plate 122 and the insulation film 128. An LCD device in accordance with a second embodiment of the present invention is, however, provided with a reflective film coated on the back surface of its TFT array substrate to avoid such an uneven display.

Figure 4A:
FIGS. 4A to 4C are sectional views of components to explain production steps of the LCD device in accordance with a second embodiment of the present invention.

The second embodiment LCD device will be explained below with reference to FIGS. 4A to 4C. A method of manufacturing the second embodiment LCD device is characterized in that a reflective film 404 is formed on a glass plate 402 as shown in FIG. 4A, a photosensitive insulation film 406 is formed on the glass plate as shown in FIG. 4B, and energy radiation is selectively carried out for transparent regions of the insulation film 406 by using a photomask 420 as shown in FIG. 4C.

Now, the second embodiment LCD device will be explained below in detail. A 400 mm×500 mm glass plate 402 is prepared and a reflective chromium film 404 is uniformly formed on its back surface (FIG. 4A). The film forming and patterning steps similar to those in an ordinary process to form thin film transistors are repeated to form thin film transistors, electrodes, wirings and pixel electrodes (but such thin film transistors, electrodes, wirings and pixel electrodes are not shown in FIGS. 4A, 4B or 4C).

Figure 4B:
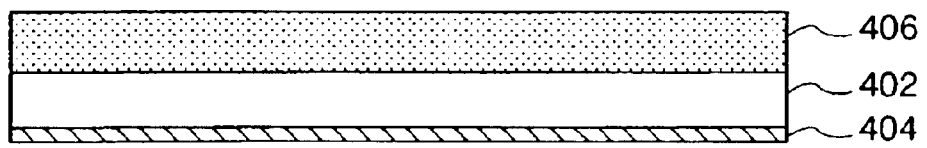
Figure 4C:
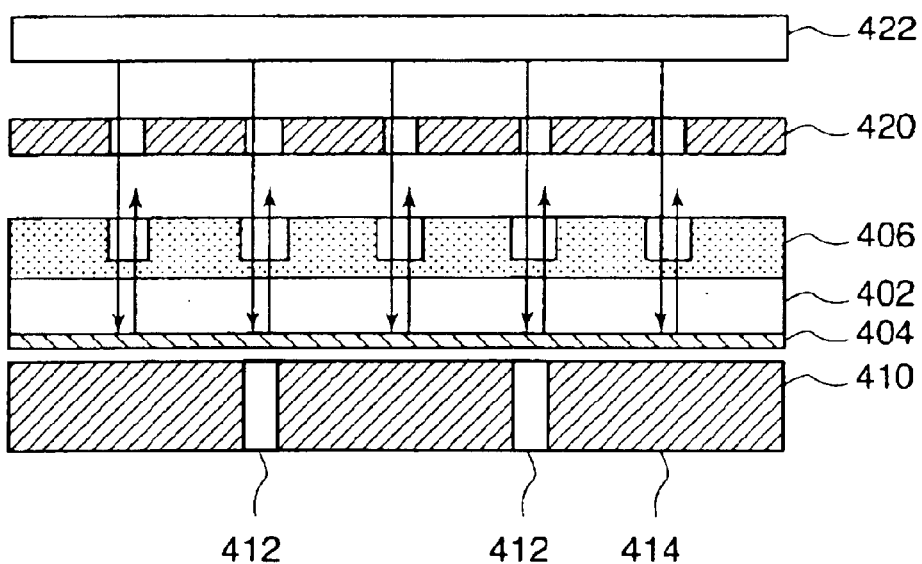
Figure 5:
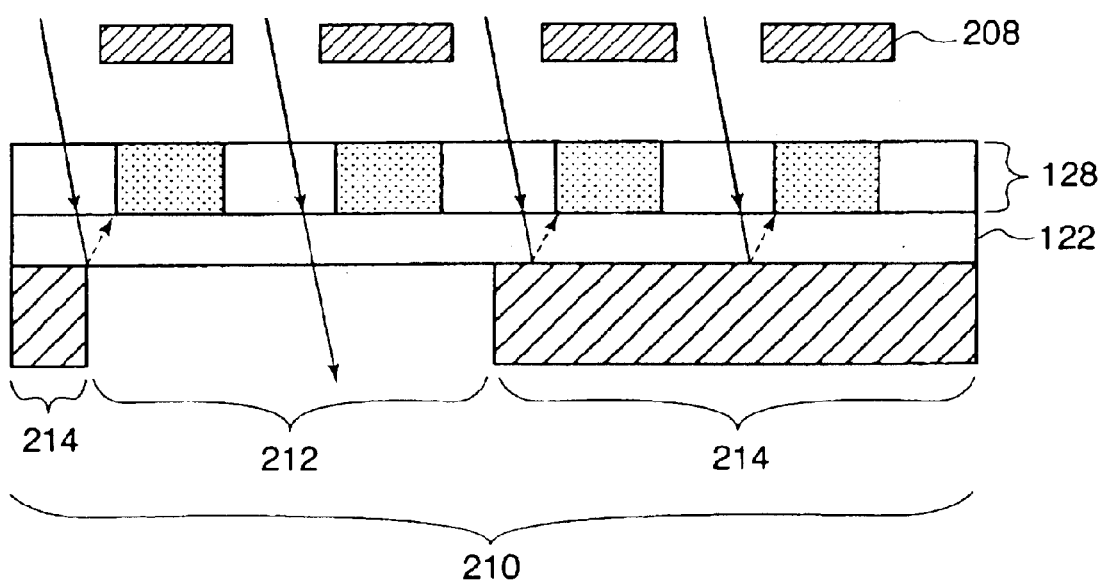
FIG. 5 is a schematically sectional view to explain a prior art production step of an LCD device.

A photosensitive organic insulation film 406 is then coated on the glass plate 402 on which the thin film transistors, etc. are formed (FIG. 4B). The glass plate 402 provided with the reflective and insulation films 404 and 406 on its dual surfaces, respectively, is loaded on an optical exposure stage 410. The exposure stage 410 is provided with holes 412 used to set the glass plate 402 on the exposure stage 410 or to detach it from the stage 410. Light from a light source 422 is radiated only through transparent portions with the photomask 420. The radiated light does not pass through the reflective film 404 but reflects from it. Such reflecting light passes through the glass plate 402 and the insulation film 406 again and returns to the photomask 420. The quantity of the light passing through, and returning to, the insulation film 406 is substantially the same whether the transparent regions are positioned above the holes or not. Dimensions or shapes of the uneven portions of the insulation film 406 formed after the exposure and development treatments are substantially the same whether the transparent regions are positioned above the holes or not. Thus, an uneven display is not visually recognized on the LCD device.

Instead of coating the reflective film 404 on the back of the glass plate 402, a light shielding or diffusion film can be alternatively attached to it to obtain substantially the same effect as in the first embodiment. A light shielding film 404 prevents the light from reaching the exposure stage 410, i.e., the light reflecting from the exposure stage 410 does not return to the insulation film 406 whether the transparent regions are positioned above the recesses or not. Also, the diffusion film diffuses the light traveling to the exposure stage 410. As a result, in either case, the light transmitted from the exposure stage 410 to the insulation film 406 remains substantially the same in quantity whether the transparent regions are positioned above the recesses or not.

After uneven (concave and convex) portions are made on the insulation film 406, reflective and transparent electrodes are formed on the concave and convex portions to define reflective and transparent regions, respectively. It is desirable to use ITO and molybdenum or aluminum films for the transparent and reflective electrodes, respectively. Further, it is also desirable to form much smaller convex and concave portions on the surface of the convex portions so that they diffuse the incident light to widen a viewing angle in the reflective display mode.

With the structure described above, the total receiving quantity of light at the portions positioned above the holes 412 of the exposure stage 410 is substantially the same as that at the portions positioned above absence of the holes 412 of the exposure stage 410. Thus, pattern sizes formed on the insulation film 406 are not different whether such pattern is positioned above the holes 412 of the exposure stage 410 or not. An uneven display has not been visually recognized in the second embodiment LCD device, either.

According to the present invention, the receiving quantity of light by a photosensitive resin film from an optical exposure stage is nil or uniform even though an exposure stage includes surface portions with uneven reflection coefficients and an LCD device has uniform brightness or displays.

What is claimed is:

1. A liquid crystal display device comprising:
   a substrate;
   thin film transistors formed on said substrate;
   an insulation film defining first and second regions to cover said thin film transistors, said first and second regions of said insulation film being different in thickness from each other;
   a transparent electrode film formed on said first region;
   a reflective electrode film formed on said second region; and
   a light shielding film provided at portions underneath boundaries of said first and second regions and extended from the boundaries through a predetermined part of said second region.

2. The liquid crystal display device according to claim 1, wherein said light shielding film is made of the same material as said thin film transistors.

3. A liquid crystal display device comprising:
   a substrate;
   an insulation film defining first and second regions to cover said thin film transistors, said first and second regions of said insulation film being different in thickness from each other;
   a transparent electrode film formed on said first region;
   a reflective electrode film formed on said second region; and
   a light shielding film provided at portions underneath boundaries of said first and second regions and extended from the boundaries through a predetermined part of said second region to prevent stray light from exposing said second region in manufacturing the liquid crystal display device.

4. The liquid crystal display device according to claim 3, wherein said light shielding film is made of the same material as said thin film transistors.

* * * * *